Patented Dec. 9, 1930

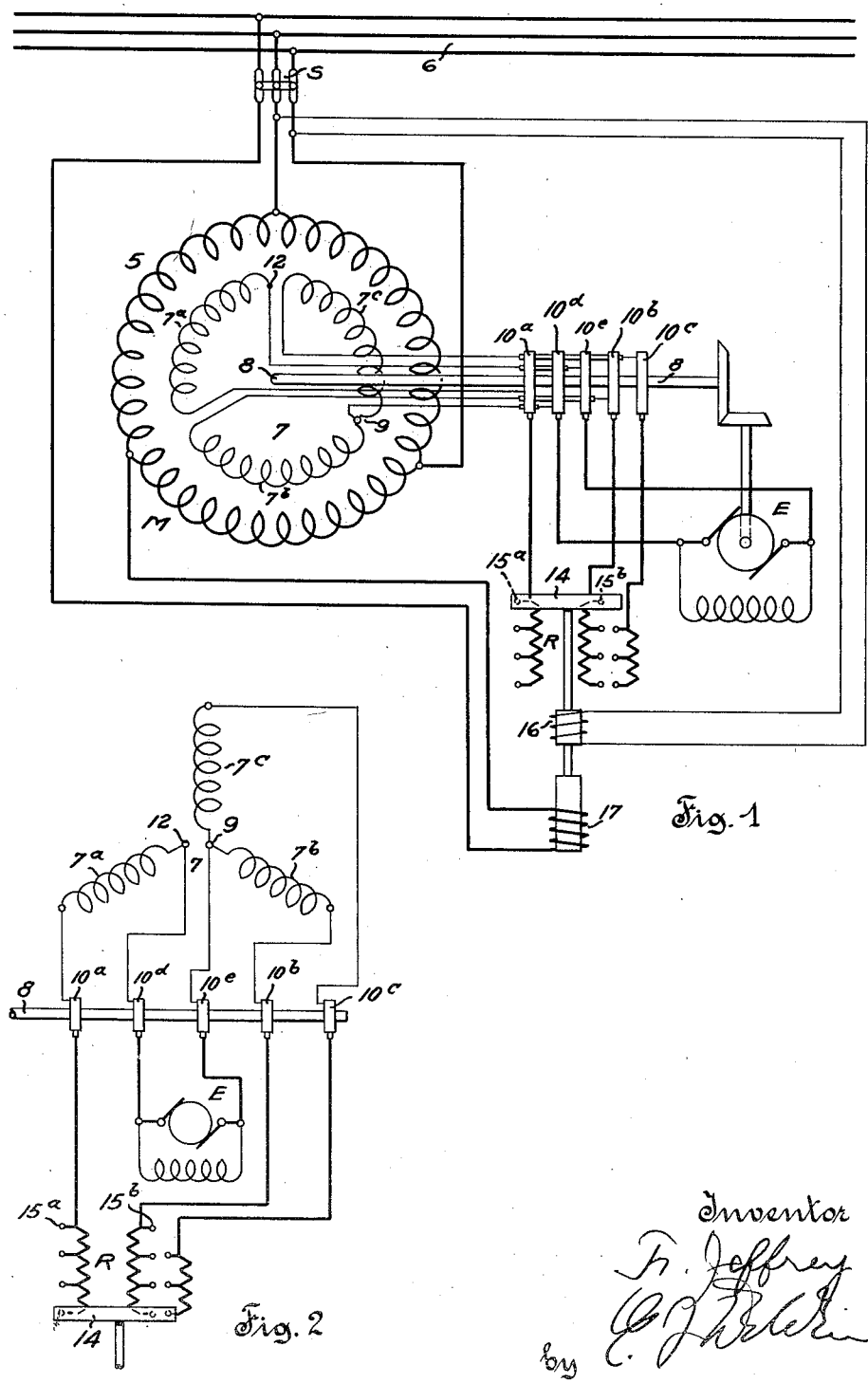

1,784,235

UNITED STATES PATENT OFFICE

FRASER JEFFREY, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE

INDUCTION SYNCHRONOUS MOTOR SYSTEM

Application filed May 10, 1928. Serial No. 276,527.

This invention relates in general to alternating current dynamo-electric machines, and it relates more particularly to such machines as are capable of being started with operating characteristics of an asynchronous or induction motor and of operating under normal conditions with characteristics of a synchronous motor.

The present invention is more particularly concerned with improvements in alternating current motor systems heretofore provided wherein the secondary element, usually the rotor, includes a multi-phase winding distributed in peripheral slots of the core, terminals of such winding being brought out, usually to collector rings, to provide for the insertion of a variable resistance in the circuit of the secondary winding during starting of the motor, and to provide for short-circuiting the resistance and for including a source of direct current excitation in the circuit of the secondary winding, when the speed reaches a predetermined point, to thereby cause the motor to be pulled into and maintained at synchronous operating speed.

With polyphase motors of the synchronous-induction type arranged for starting as an induction motor and for normal operation as a synchronous motor, it is desirable that the number of connections to the secondary winding and the number of collector rings for securing the desired connection of the winding in circuit with a variable resistance and a direct current exciter under both starting and running conditions be reduced to a minimum, in the interest of economy and simplicity of construction and operation. A system of this character that is possessed of desirable commercial features is one wherein the winding of the secondary element of the motor is of the three phase, Y-connected type and the source of direct current excitation remains in circuit with this winding during both the starting operation of the motor and normal running as a synchronous motor, the exciting source being preferably connected in series in the lead connecting one of the phase windings to the neutral connection point, thus insuring that the exciter is not subjected to excessive potentials at any time. With a system of this character, while uniform and powerful starting torque and reasonably satisfactory running conditions may be secured, nevertheless, there are limitations as to the exciter voltage that can be utilized in the safe and economical operation of the machine.

In accordance with features of the present invention, the described limitations existing in the matter of maximum exciter voltage are overcome to a great extent, while there are retained the desirable attributes of the prior art in the matter of high and uniform starting torque and satisfactory power and economy during normal synchronous operation; and one feature of the present invention is that the exciter may remain in circuit during both induction motor starting conditions and synchronous motor running conditions, and still this exciter, because of its insertion at a neutral point of the winding, is not subjected to the full voltage induced in the connected phase winding sections of the secondary of the motor at the beginning of the starting operation, as would be an incident of operation with a system where the exciter is connected to an outer terminal of a phase winding, and, hence, there is no necessity of providing special insulation for the windings of the exciter in order to insure protection of the latter against breakdown and short circuit through the core of the exciter or through the latter and ground; and, again, with one phase winding out of the energizing circuit during operation as a synchronous motor and the other two phase windings connected in series at this time, the use of a higher exciter voltage is permissible; and all of the desired results may be secured without additional complications in the matter of connections or switching or controlling equipment.

The present invention is more particularly concerned with an improved modification of the type of induction-synchronous motor system disclosed in the application of R. B. Williamson, Serial No. 273,797, filed April 30, 1928.

It is an object of the present invention to provide a system including a polyphase alternating current motor which is of simple and improved design and wherein the motor is adapted to be started as an induction motor and operated normally as a synchronous motor, and wherein the source for furnishing direct current excitation during operation of the machine at synchronous speed may remain in circuit without harmful effects, throughout operation both as an induction motor during the starting period and as a synchronous motor during normal running, while capable of supplying a desirably high direct current voltage to the secondary winding during operation of the motor at synchronous speed.

It is a further object of the present invention to provide an improved system of the character set forth hereinabove wherein the direct current exciter is permanently connected to several phases of a polyphase alternating current winding at a neutral connection point of such winding.

It is a further object of the present invention to provide in a system of the character set forth hereinabove an improved arrangement wherein the secondary winding is of the three-phase Y-connected type and the direct current exciter is connected in series with two of the phase winding sections of the secondary winding at an intermediate connection point of such phase winding sections, another of the phase winding sections being inactive during normal operation of the machine at synchronous speed.

These and other objects and advantages are attained by the present invention, various novel features of which will be apparent from the description and drawings herein, disclosing an embodiment of the invention, and will be more particularly pointed out in the claims.

In the drawings:

Fig. 1 is a diagrammatic showing of an alternating current motor system embodying features of the present invention.

Fig. 2 is a simplified diagrammatic showing of the circuits associated with the secondary element of the motor of Fig. 1.

In accordance with the disclosure of Figs. 1 and 2, the primary element of an alternating current motor, this element being considered as the stator, is provided with a three-phase energizing winding 5, the same being of the distributed type and supplied from a three-phase alternating current distribution line 6, through a controlling switch S. The secondary element of the motor, considered as the rotor, is provided with a three-phase energizing winding 7 distributed in peripheral slots of the core, the several phases of this winding being designated 7a, 7b and 7c, and is mounted on the shaft 8.

As indicated, the inner terminals of the sections or phase windings 7b and 7c of the secondary winding are connected to a common or neutral point 9, and the outer terminals of these phase windings and the phase winding 7a are connected to collector rings 10b, 10c and 10a, respectively, on the rotor shaft; and where, as indicated herein, the source for furnishing direct current energy to the secondary winding 7 during operation of the motor at synchronous speed, is not directly connected to the shaft of the motor, the neutral point 9 of the secondary winding may be connected to collector ring 10d; and the inner terminal of the winding section 7a, indicated at 12, may be connected to collector ring 10e. Brushes contacting with collector rings 10a, 10b and 10c are connected to terminals of sections of a three-phase variable resistance R, a movable short-circuiting device 14 being provided for engagement with suitable contact points associated with these resistances to short-circuit all or any desired portion of the resistance, more particularly during the starting operation of the motor as an induction motor. The uppermost contact points associated with the resistance sections connected to collector rings 10a and 10b, that is, those contact points with which the short-circuiting element 14 engages when the resistance sections are fully short-circuited, are designated 15a and 15b, respectively; and it is to be noted that the resistance section connected to collector ring 10c, and hence winding section 7c, is not provided with a contact point corresponding to the contact points 15a and 15b, and hence when the short-circuiting element 14 is in its uppermost position wherein it engages contacts 15a and 15b and thus short-circuits all the resistance sections connected to the outer terminals of the winding sections 7a and 7b, the circuit through the winding section 7c is open at this point.

A direct current exciter E, here indicated as being of the shunt type, and provided with suitable field regulating means of conventional type, is connected to brushes contacting with collector rings 10d and 10e, the effect of this connection being to insert the exciter in series with the winding section 7a, between the inner terminal 12 thereof and the common connection 9 of the winding sections 7b and 7c, while the connections between the outer terminals of the several winding sections are completed through the short-circuiting element 14, as during operation as an induction motor. And the exciter, during normal synchronous operation of the motor, when the short-circuiting element 14 is in its uppermost position and thus completes the circuit through only winding sections 7a and 7b, supplies direct current to the winding sections 7a and 7b in series, the winding section 7c not being in circuit at this time.

Any suitable arrangement may be provided for actuating the movable short-circuiting element 14 and thus controlling the effective value of the variable resistance R in the second circuit of the motor M, a satisfactory arrangement including one which automatically varies the speed of the motor as the load thereon varies, such an arrangement securing automatic cutting out of the resistance during the starting operation, while preventing excessive current in the circuit of the motor and insuring a proper degree of acceleration thereof. The type of regulating device shown includes an electromagnetic actuating device comprising a core and its winding 16 supplied from the motor supply line, preferably at a point between the switch S and the primary winding of the motor, so as to be rendered active when the switch S is closed, this winding tending to operate the regulating element 14 in a direction to cut out resistance, and a second core and its winding 17 in series with the primary circuit of the motor M, the latter element of the regulator exerting an effect on the element 14 opposite to that of the electromagnet 16. The movable element of the regulator is biased by gravity, as indicated, or other suitable means, to the position wherein maximum resistance is included in the secondary circuit, as indicated in Fig. 2.

The exciter E may preferably be driven from the main motor M through a mechanical drive, as indicated in Fig. 1, which insures operation of the exciter at a suitably high normal operating speed. Through this arrangement, the speed of operation of the exciter always bears a definite relation to the speed of operation of the main motor. However, where it is possible to use a direct-connected exciter or one having its windings carried by the core of the secondary element of the motor, use of slip rings 10d and 10e may be avoided.

Assuming that the motor M is inoperative and it is desired to start the same. The switch S is closed and energy is supplied to the primary winding 5 either directly from the supply line 6 or through potential reducing starting transformers, until the speed of the motor has been brought up to a value approaching synchronous speed, at which time the winding 5 is connected directly to the alternating current supply line 6. With the resistance R fully included in circuit at starting, as indicated in Fig. 2, the currents induced in the circuit of the secondary winding 7 and the exciter E are held to a reasonable and safe value, for the electro-magnet 16 is effective to actuate the movable element 14 of the regulator only as fast as the series winding of the electromagnet 17 will permit, the speed of operation being predetermined so as to provide for a safe current in the secondary circuit of the motor. As the motor comes up to speed, increments of the variable resistance R are thus short-circuited by the operating arm 14 until, as the speed approaches fairly close to synchronous speed of the motor, substantially all of the variable resistance R is short-circuited.

As the speed of the motor approaches synchronous speed, the voltage generated at the terminals of the exciter E whose speed has increased with the speed of the main motor, becomes sufficiently high so that but little induced voltage, due to the effects of the primary winding, is necessary in order to supply the required energizing current in the secondary winding 7; and, with the continued short-circuiting of sections of resistance R, the motor consequently more closely approaches synchronous speed, and preferably automatically reaches synchronous speed when the short-circuiting element 14 reaches its uppermost position wherein it engages contacts 15a and 15b and includes the two phase windings 7a and 7b in series in the circuit of and energized by direct current supplied by the exciter. Under these desired normal running conditions, the circuit through the third section of resistance R and the phase winding 7c is open, as indicated in Fig. 1, the current at this time passing from the positive terminal of the exciter, through the collector ring 10d, the winding section 7a, collector ring 10a, to the short-circuiting element 14 of the variable resistance R, thence to collector ring 10b and winding section 7b, neutral connection point 9, and through collector ring 10e, to the negative terminal of the exciter, the two winding sections 7a and 7b being in series across the terminals of the exciter.

The motor continues to operate as a synchronous motor with its direct current field suitably and wholly energized by the exciter E until some disturbing condition, such as an excessive overload, occurs. In case the motor should get out of step due to any such excessive overload, the only effect is that the speed of the motor drops to a point where the slip, supplementing the voltage of the exciter, is sufficient to furnish or cause the required excitation of the secondary element to carry the overload present. And the effect of this excessive overload, reflected through the winding of the electromagnet 17, may be such as to cause the insertion of an increment of resistance R in the secondary circuit of the motor, thus assisting in the development of sufficient voltage and power to carry the overload. As the excessive overload or other disturbing factor disappears, the speed of the motor increases, and the motor again automatically synchronizes itself and continues to operate at its normal or synchronous speed.

It will be apparent that, through the system apparatus described hereinabove, wherein the direct current exciter is normally connected in circuit, the synchronous motor is readily started or controlled through as simple a form of apparatus as is ordinarily used on a wound rotor induction motor, and, with the exciter connected in circuit at the neutral point of the distributed phase windings, the required uniform starting torque may be developed during operation of the motor as an induction motor by utilizing all three phases of the secondary winding in circuit closed through the exciter, without subjecting the exciter windings to any unduly high potential therefor, such as is induced in the secondary winding at the beginning of the starting operation; and with the provisions made for opening the circuit through one of the secondary phase windings and thus connecting the remaining phase windings in effective series relation, the desired direct current energization may be secured during synchronous motor operation with a higher exciter voltage, with substantial and desirable resulting economies and without appreciable sacrifice in the matter of desirable operating characteristics.

It should be understood that the invention claimed is not limited to the particular details of construction and arrangement shown and described herein, for various modifications within the scope of the claims will be apparent to persons skilled in the art.

It is claimed and desired to secure by Letters Patent:

1. In combination, a dynamo-electric machine adapted for operation as both an alternating current induction motor and synchronous motor and having its secondary or exciting element provided with a polyphase winding having the phase winding sections thereof connected to a neutral point, a direct current exciter, and means for connecting said exciter in circuit with a plurality of phases of said secondary winding with the latter in series with each other and with said exciter at said neutral point during the starting of said motor as an induction motor and for rendering one of the phases of said secondary winding inactive upon the attainment by said motor of an operating condition substantially corresponding to operation as a synchronous motor.

2. In combination, a dynamo-electric machine adapted for operation as both an alternating current induction motor and synchronous motor, said machine having its secondary or exciting element provided with a distributed winding of the polyphase type, having at least three angularly displaced phase winding sections having a common connection point, a direct current exciter connected in series with a plurality of phases of said secondary winding at said common connection point thereof, and means for rendering one of the phases of said secondary winding inactive upon the attainment by said motor of an operating condition substantially corresponding to operation as a synchronous motor.

3. In combination, a dynamo-electric machine adapted for operation as both an alternating current induction motor and a synchronous motor, said machine having its secondary or exciting element provided with a distributed winding of the three-phase, Y-connected type, a direct current exciter connected in the circuit between a terminal of one phase winding and the netural connection point of said phase windings during operation of said motor both as an induction motor and synchronous motor, and means operative to render one of said phase windings inactive during operation of said motor under conditions substantially corresponding to operation as a synchronous motor.

4. In combination, a dynamo-electric machine adapted for operation as both an alternating current induction motor and synchronous motor, said machine having its secondary or exciting element provided with a distrubuted winding having three angularly displaced phase winding sections, terminals of two of said phase windings being connected to a neutral point, a direct current exciter connected in series with two of said phase winding sections during both starting and normal running conditions of said motor, and means for connecting the third one of said phase winding sections in circuit during starting and disconnecting the same from circuit during normal running conditions of said motor.

5. In combination, a dynamo-electric machine adapted for operation as both an alternating current induction motor and synchronous motor, said machine having its secondary or exciting element provided with a polyphase distributed winding, a variable resistance device in the circuit of said winding, a direct current exciter connecting a plurality of secondary winding sections of different phase in series with each other, and means operative when said variable resistance device is in position substantially corresponding to mimimum included resistance for rendering a portion of one of said phase windings inactive for energizing purposes.

6. In combination, a dynamo-electric machine adapted for operation as both an alternating current induction motor and synchronous motor, said machine having its secondary or exciting element provided with a distributed winding of the three-phase type having terminals of two of said phase windings connected to a neutral point, a direct current exciter connected between a corresponding terminal of the third phase winding and said neutral point, a polyphase variable resistance device connectible in the circuit of said exciter and said phase windings, and means operative when said variable resistance device is in position substantially corresponding to minimum included resistance for rendering one of said phase windings inactive for energizing purposes.

7. In combination, a dynamo-electric machine adapted for operation as both an alternating current induction motor and a synchronous motor, said motor having its secondary or exciting element provided with a distributed winding of the polyphase type having at least three angularly displaced phase winding sections, said phase winding sections having their outer terminals connectible together through a variable resistance, and two of said phase windings having a neutral connection point, a direct current exciter electrically connected between a terminal of a third phase winding section and said neutral connection point, and means operative to render one of said two connected phase windings inactive for energizing purposes when said variable resistance is in a condition corresponding to normal operation of said motor as a synchronous motor.

8. In combination, a dynamo-electric machine adapted for operation as both an alternating current induction motor and a synchronous motor, said motor having its secondary or exciting element provided with a distributed winding of the polyphase type having at least three angularly displaced phase winding sections, said phase winding sections having their outer terminals connectible together through a variable resistance, and two of said phase windings having a neutral connection point, a direct current exciter mechanically connected to said machine to be driven thereby and electrically connected between a terminal of a third phase winding section and said neutral connection point, and means operative to render one of said two connected phase windings inactive for energizing purposes when said variable resistance is in a condition corresponding to normal operation of said motor as a synchronous motor.

9. In combination, a dynamo-electric machine adapted for operation as both an alternating current induction motor and synchronous motor, said motor having its secondary or exciting element provided with a distributed winding of the three-phase Y-connected type, a direct current exciter connected to be mechanically driven by said machine and electrically connected between the inner terminal of one of said phase winding sections and said neutral point, and a variable resistance connectible to the outer terminals of the several phase winding sections and effective to establish the circuit therebetween during operation of said motor as an induction motor and effective to complete the circuit through only two of said phase winding sections under normal operating conditions as a synchronous motor.

10. In combination, a dynamo-electric machine adapted for operation as both an alternating current induction motor and synchronous motor, said motor having its secondary or exciting element provided with a distributed winding of the three-phase Y-connected type, a direct current exciter connected to be mechanically driven by said machine and electrically permanently connected between the inner terminal of one of said phase winding sections and the neutral connection point of said phase windings, and a variable resistance device connected to the outer terminals of the several phase winding sections and in the normal circuit through said exciter and effective to establish a circuit through all three of said phase winding sections during starting of said motor as an induction motor and to render one of said phase winding sections inactive during operation of said motor as a synchronous motor with the field thereof supplied by said exciter.

11. An alternating current motor having its secondary or exciting element provided with a distributed winding of the three-phase, Y-connected type, with a source of direct current excitation permanently connected in circuit between the neutral connection point of two of said phase winding sections and a terminal of the other of said phase winding sections, and means for rendering one of said first group of phase winding sections ineffective for excitation purposes during operation of said motor at synchronous speed.

12. The method of operating an alternating current motor capable of operation both as an induction and synchronous motor and having its secondary or exciting-element provided with a three-phase winding having its phase winding sections connected at a neutral point, with a direct current exciter connected in circuit between one of said phase winding sections and said neutral point, which comprises starting said motor as an induction motor with said three-phase winding and said exciter in circuit, and disconnecting one of said phase-winding sections from the circuit of the other phase winding sections and said exciter when the speed of the motor reaches a value substantially corresponding to synchronous speed.

13. The method of operating an alternating current motor capable of operation both as an induction motor and synchronous motor and having its secondary or exciting element provided with a polyphase winding having at least three phase winding sections connected at a point which is neutral with respect to voltage induced by the primary winding and having a direct current exciter connected in circuit between a terminal of one of said phase winding sections and said neutral point, and said phase winding sections being connectible in circuit with a polyphase variable resistance, which comprises starting said motor as an induction motor with said variable resistance and exciter in circuit with the secondary winding, reducing the value of said variable resistance as the speed of said motor approaches synchronous speed, and rendering one of said winding sections inactive when the speed of said motor reaches a value substantially corresponding to synchronous operation.

In testimony whereof, the signature of the inventor is affixed hereto.

FRASER JEFFREY.